Jan. 11, 1927.

B. M. W. HANSON 1,613,824

GAUGE

Filed March 27, 1925

Inventor

Bengt M. W. Hanson

By T. Clay Lindsey

His Attorney

Patented Jan. 11, 1927.

1,613,824

UNITED STATES PATENT OFFICE.

BENGT M. W. HANSON, OF HARTFORD, CONNECTICUT; EINAR A. HANSON AND CLARENCE E. WHITNEY EXECUTORS OF SAID BENGT M. W. HANSON, DECEASED.

GAUGE.

Application filed March 27, 1925. Serial No. 18,836.

This invention relates to gauges. In the present illustrative disclosure, the invention is shown as incorporated in a gauge for screw threaded members to which use it is peculiarly applicable. It is to be understood that the present disclosure is by way of illustration only, as the invention is susceptible of other embodiments than that herein shown.

The aim of the present invention is to provide a gauge of the character described having various features of novelty and advantage, and which is particularly characterized by the facility and quickness with which it may be employed to gauge threaded pieces and the like; by the accuracy with which the pieces may be gauged; by the precision and nicety with which the gauging members may be relatively adjusted; by its durability and long life; and by its simplicity in construction.

Other objects will be in part obvious and in part pointed out more in detail hereinafter.

The invention accordingly consists in the features of construction, combination of elements and arrangement of parts which will be exemplified in the construction hereinafter set forth, and the scope of the application of which will be indicated in the appended claims.

Figure 1:
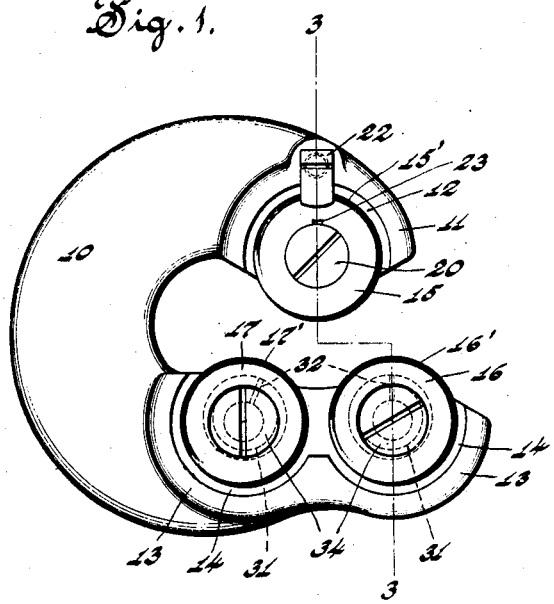
Figure 1 is a side elevational view of my improved gauge.
Figure 2:
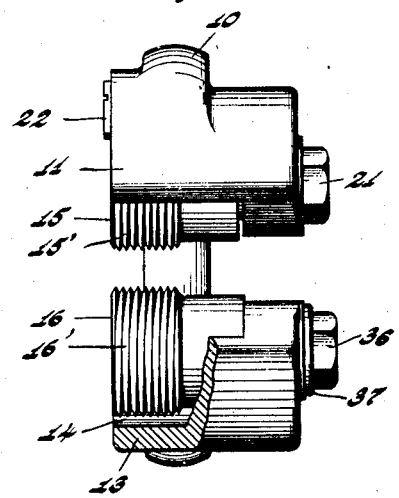
Fig. 2 is a front view thereof with a portion of the frame broken away.

Referring to the drawings in detail, 10 is a frame of any suitable construction, it being here shown, for illustrative purposes, as being in the form of a C having, at one end, a guard 11 provided with a parti-cylindrical socket 12, and at its other end with a guard 13 having a pair of parti-cylindrical sockets 14 in opposed relation to the socket 12. Located in one end of the frame, in the present instance within the socket 12, is a gauging member which constitutes one jaw of the gauge, this gauging member, in the present instance, being in the form of a cylindrical jaw 15. The other jaw of the gauge is constituted of two cylindrical jaw members 16 and 17 positioned within the sockets 14 and one behind the other. The jaw member 15 is arranged in opposed and staggered relation to the other two jaw members, that is to say, it is located out of the plane of the active gauging surfaces of the jaw members 16 and 17 and with its axis at substantially like distances from the axes of the members 16 and 17. The three axes of the members are arranged so that their jaw members, when viewed from one end of the axes, form the apices of an isosceles triangle. In the present illustrative disclosure the round jaw members are respectively provided with screw threads 15', 16', and 17', each of which is substantially similar in all respects to the thread desired on the piece to be gauged, but running in the opposite direction thereto.

In order to permit gauging of the work or piece to be measured without turning or rotating that piece to accommodate the lead of the thread thereon, one of the gauging members is mounted for endwise or longitudinal movement, in the present instance the jaw member 15 being so mounted. In the drawings the member 15 is illustrated as being slidably supported by a stud 20 secured in place on the frame by a nut 21. The member is held against withdrawal from the stud by a stop screw 22 or other suitable means. In the present illustrative disclosure, the jaw 15 is keyed for sliding movement, the roll having a longitudinally extending key-way 23 into which extends a key 24 mounted in the stud 20.

Figure 3:
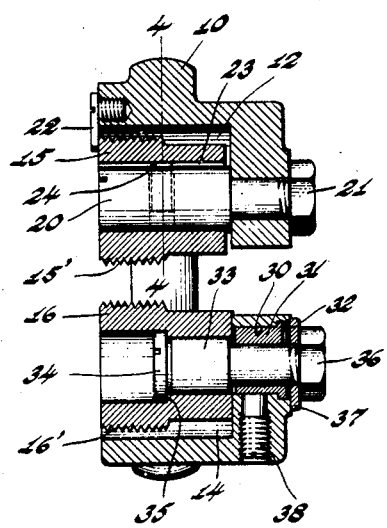
Fig. 3 is a sectional view taken substantially on line 3—3 of Fig. 1.
Figure 4:
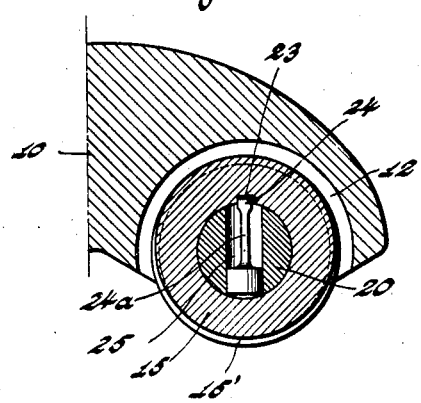
Fig. 4 is a transverse section through the upper gauging member and shows the manner in which this gauging member is resiliently keyed to its support or bearing, this view being taken on line 4—4 of Fig. 3.

I have found that if the key 24 were rigid and fitted closely within the key-way, the gauging member 15, when the piece to be gauged is brought into engagement therewith may have a tendency to bind against the stud and not slide freely and, particularly is this the case, where the operator brings the piece to be gauged into engagement with the gauging member with the axes of the piece and member out of parallelism. In order to avoid binding between the gauging member 15 and its stud, that is to say, in order to reduce friction therebetween and provide for a relatively free sliding movement of the gauging member, the arrangement is such as to allow of a slight helical movement of the member 15 when engaged by the piece to be tested. In the present instance, this is brought about by providing for sliding movement and by making the key resilient or yielding, the key being shown as having a resilient portion or stem 24ª. The ends of the key respectively fit in the key-way 23 and in a diametrical opening 25 in the stud. It will be noted that the spring key normally holds the jaw 15 in neutral position, that is to say, in a position from which the jaw may always have a very slight helical movement in either direction when the piece to be gauged is brought into contact therewith. In other words, if the piece to be tested is moved into engagement with the jaw 15, the jaw will have a slight helical movement and then, when the piece is moved from engagement with the jaw, the spring key will move the latter to the position shown in Fig. 3 and from which position the roll may be again moved in either direction when the same or another piece of work is brought into engagement therewith. The extent of helical movement of the jaw 15 is, of course, not sufficient to throw the jaw members out of proper pitch relative to one another.

For the purpose of adapting the gauge for use in gauging threaded members of various specified working allowances or tolerances, novel and advantageous means are provided for adjusting each of the jaw members 16 and 17 relative to the opposed jaw or gauging member 15, and these means are such that the adjustments may be made with great nicety and accuracy, and the gauging members 16 and 17 (which are normally fixed against turning movement) may, when desired, be turned about their own axes to bring into play new gauging areas without disturbing the adjustments. The cylindrical jaw members 16 and 17 are similarly mounted and a description of one is illustrative of both. Closely fitting within an opening 30 in the frame and, preferably, of less length than that opening, is an eccentric bushing 31. The bushing may be adjusted as by means of a tool inserted into a kerf 32 provided in the outer end of the bushing. Eccentrically mounted within the bushing is a stud or shaft 33 on which the jaw member 16 has a relatively close fit. The stud 33 has a head 34 engaging against an internal shoulder 35 on the member 16, and the parts are clamped together by a nut 36 which is screwed up against a washer 37 engaging the frame about the outer end of the hole 30. The bushing 31 may be secured, if desired, in adjusted position by a set screw 38.

Assuming, for purposes of illustration, that the gauge is particularly constructed for measuring threaded member 1″ in diameter, and the specified limits of accuracy for the particular threaded member to be gauged are 1″ and 1″ minus .002, the procedure is as follows: The nut 36 and the washer 37 are removed and the screw 38 is loosened, and then the eccentric bushing 31 is adjusted until a threaded test piece of exactly 1″ in diameter will just move between the gauging members 15 and 16, the bushing will then be secured in adjusted position by turning up the screw 38 and the gauging member 16 will be clamped by the nut 36. The rearmost gauging member 17 will then be adjusted in a similar manner to a position where a threaded test piece having a diameter of exactly .998″ will just pass between the gauging members 15 and 17. The threaded member to be gauged is now moved with its axis substantially parallel to the axes of the gauging members between the gauging members 15 and 16, and when brought into engagement with the member 15, the same will be given a helical movement whereby the lead of the thread being gauged is accommodated. If the piece passes between the gauge members 15 and 16, which constitute a "go gauge," but will not pass between the members 15 and 17, which constitute a "no go" gauge, the piece is acceptable as being within the selected limits of tolerances.

From the foregoing description, taken in connection with the accompanying drawings, it will be seen that pieces of work may be quickly and accurately tested with great facility, it being possible to measure the pieces within "go" and "no go" limits by passing each piece but once into the gauge. It will also be seen that not only may the diameters of the pieces be tested, but the accuracy of the pitch and shape of the thread may also be determined. Owing to the sliding movement of the jaw 15, the pieces may be tested without rotating or screwing the latter between the gauging members and, owing to the spring connection or key 24, when a piece of work is brought into engagement with the member 15, binding or cramping, together with the resultant damage to the gauging members, is guarded against. Each of the jaws 16 and 17 may be very quickly adjusted with great nicety relative to the opposing jaw 15 by adjusting the eccentrics 31. The gauging members 16 and 17 will have a relatively long life owing to the fact that, when they become worn along any line, these members may be adjusted about their own axes so as to bring into opposed relation to the jaw 15 new gauging surfaces. This may be done without changing the adjustment of the bushings 31 by merely loosening the nuts 36, turning the gauging members a slight extent about the studs 33 and then clamping the parts by screwing home the nuts 36. It will be further observed that the gauge is very simple in construction, comprises but a relatively few number of parts, and may be economically manufactured and the gauging members are protected against injury by the guards 11 and 13.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a gauge of the character described, a frame having opposed gauging members, one of which comprises a round jaw member provided with a gauging thread, a bearing concentrically supporting said jaw member, and a bushing eccentrically supporting said bearing and mounted for adjustment in said frame.

2. In a gauge of the character described, a frame having opposed gauging members, one of which comprises a cylindrical jaw member, an eccentric bushing, a stud eccentrically mounted in said bushing, said jaw member being concentrically mounted on said stud for adjustment about its own axis, said bushing being mounted in said frame for adjustment to move said jaw member relative to an opposed gauging member, and means for securing said stud and jaw member against rotation.

3. In a gauge of the character described, a frame having opposed gauging members, one of which comprises an externally threaded cylindrical jaw member, an eccentric bushing mounted for adjustment in said frame, a stud eccentrically mounted in said bushing, said jaw member being concentrically mounted on said stud for adjustment about its own axis, means for securing said stud and jaw member against rotation, and means for securing said bushing in adjusted position.

4. In a gauge of the character described, a frame having an opening, opposed gauging members mounted in said frame, one of which comprises an externally threaded cylindrical jaw member, a bushing mounted for adjustment in said opening and terminating short of each end thereof, a stud eccentrically mounted in said bushing, said jaw member being concentrically mounted on one end of said stud and engaging at one end against one side of said frame, said jaw member having an abutment and said stud having a head engaging thereagainst, a washer on the outer end of said stud and abutting against the other side of said frame about said opening, and a nut on the outer end of said stud engaging said washer.

5. In a gauge of the character described, a frame having opposed gauging members, one of which includes a cylindrical jaw member provided with a gauging thread, and a bearing supporting said jaw member, and means whereby said member has a helical movement on said bearing.

6. In a gauge of the character described, a frame having opposed gauging members, one of which comprises a cylindrical jaw member provided with a gauging thread, a bearing for said member, and a connection between said bearing and member permitting of a helical movement of said member in either direction.

7. In a gauge of the character described, a frame having opposed gauging members, one of which comprises a cylindrical jaw member having a gauging thread, a bearing for said member, said member being mounted for a slight limited helical movement, and means for normally urging said member to, and holding the same in, a position from which it may be helically moved when a piece of work is brought into engagement therewith.

8. In a gauge of the character described, a frame having opposed gauging members, one of which comprises a cylindrical jaw member having a gauging thread, a bearing for said member, and a connection between said member and bearing for permitting of a limited helical movement of the former, said connection normally holding said member in a position between the limits of its helical movements.

9. In a gauge of the character described, opposed gauging members, one of which comprises a cylindrical jaw member having a gauging thread, a support for said member, and a resilient key between said member and support.

10. In a gauge of the character described, a frame having opposed gauging members, one of which comprises a cylindrical jaw member provided with an internal key-way and on its periphery with a gauging thread, a stud supporting said member and having a transverse opening, and a key having its opposite ends fitting respectively in said keyway and opening, said key, between its ends, being resilient.

11. In a gauge of the character described, a frame, three cylindrical jaw members mounted thereon and each having a gauging thread on its periphery, said members being arranged with their axes when viewed from one end of the gauge at the apices of an isosceles triangle, one of said members being mounted for longitudinal sliding movement.

12. In a gauge of the character described, a frame, three cylindrical jaw members mounted thereon and each having a gauging thread on its periphery, two of said members being arranged one behind the other and the third of said members being in staggered and opposed relation to the first two, means whereby said third member has a limited helical movement, and each of said first two members being supported for adjustment relative to said third one and each being adjustable about its own axis.

13. In a gauge of the character described, a frame, three cylindrical jaw members mounted thereon and each having a gauging thread on its periphery, two of said members being arranged one behind the other and the third of said members being in staggered and opposed relation to the first two, a stud supporting said third member, and means comprising a resilient key and permitting of a small limited helical movement of said third member.

14. In a gauge of the character described, a C frame having at one end a guard forming a pair of parti-cylindrical sockets one behind the other, said frame having at its other end a guard forming a parti-cylindrical socket in opposed and staggered relation to said first mentioned sockets, and a cylindrical jaw member located in each socket, each of said members having a gauging thread.

BENGT M. W. HANSON